Jan 6, 1931. R. N. VAN BUSKIRK 1,787,501
BRAKE
Filed July 12, 1928
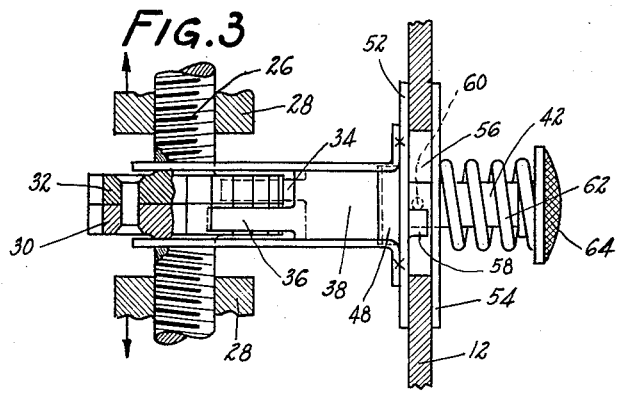
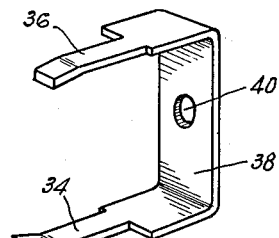
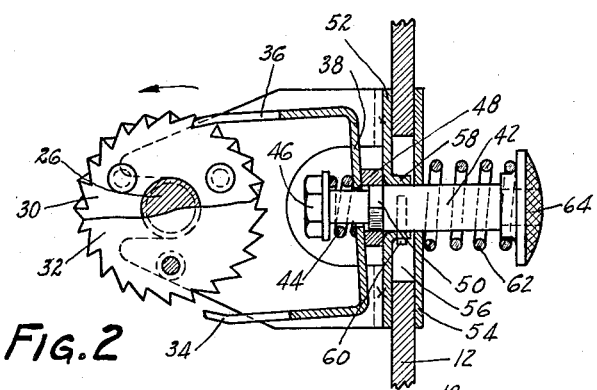
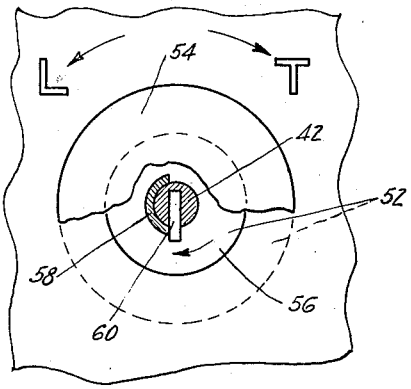
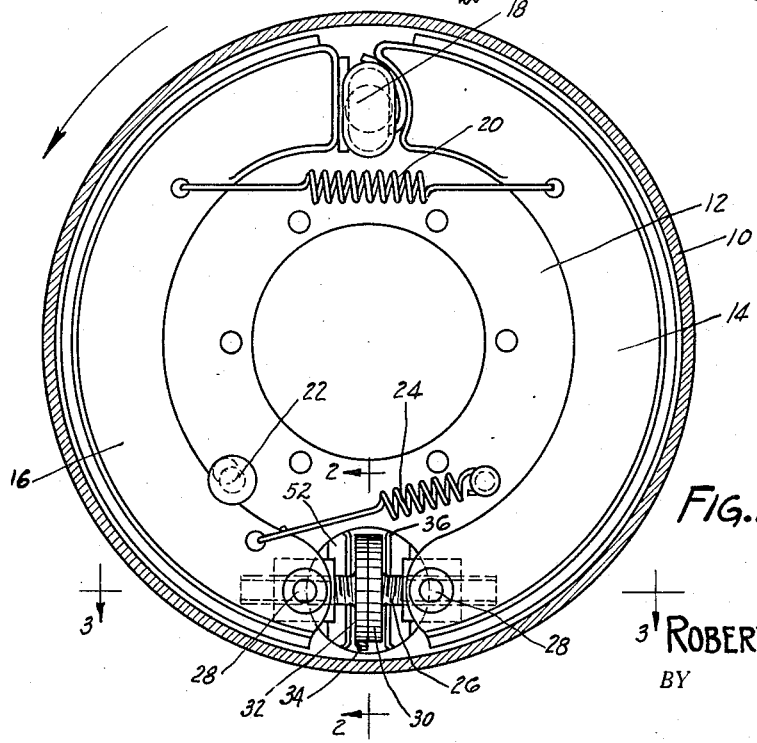
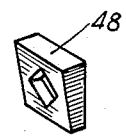
INVENTOR.
ROBERT N. VAN BUSKIRK
BY
ATTORNEY.

Patented Jan. 6, 1931

1,787,501

UNITED STATES PATENT OFFICE

ROBERT N. VAN BUSKIRK, OF DETROIT, MICHIGAN, ASSIGNOR TO BENDIX BRAKE COMPANY, OF SOUTH BEND, INDIANA, A CORPORATION OF ILLINOIS

BRAKE

Application filed July 12, 1928. Serial No. 292,139.

This invention relates to brakes, and is illustrated as embodied in an internal expanding brake for an automobile. An object of the invention is to provide the brake, or an equivalent mechanism, with a readily-operated adjusting device, preferably arranged to be set so that it can be manipulated either to tighten or loosen the adjustment of the brake.

In one desirable arrangement, the adjusting device is shown as a threaded connection having a collar or the like formed with a ratchet. Whether or not this type of connection is used, I prefer to operate the adjusting device by novel means extending outside of the brake, where it is readily accessible, and which may be in the form of a slidable plunger operating one or more pawls engageable with the above-described ratchet.

An important feature of the invention relates to providing means, for example a cam operated by a turning movement of the plunger, for selectively shifting into operative position one or another of a plurality of pawls engageable with the ratchet, so that the ratchet may be turned in either direction by sliding movement of the plunger.

Other objects and features of the invention, including novel means for holding the ratchet against shifting during ordinary use of the brake, and various novel and desirable details of construction, will be apparent from the following description of the illustrative embodiment shown in the accompanying drawing, in which:

Figure 1 is a vertical section through the brake, just inside the head of the brake drum, showing the friction means of the brake in side elevation;

Figure 2 is a partial section, through the novel adjusting means, on the line 2—2 of Figure 1;

Figure 3 is a partial section through the adjusting means at right angles to Figure 2, on the line 3—3 of Figure 1;

Figure 4 is a partial elevation of the backing plate, broken away in vertical section through the above-described plunger substantially in the plane of the backing plate;

Figure 5 is a perspective of a device having two pawls, and which forms part of the illustrated adjusting means; and Figure 6 is a perspective of the cam for selectively shifting the pawls to operative position.

In the arrangement selected for illustration, the brake includes a rotatable drum 10, at the open side of which is a support such as a backing plate 12, and within which is the retarding means, shown as including two floating friction shoes 14 and 16. These shoes are connected, by a novel floating adjustable joint described below, to form an expansible friction device anchoring at one end when the drum is turning in one direction and at the other end when the drum is turning in the other direction.

In this particular brake, the shoes anchor against an applying device shown as an angularly-movable double cam 18, shoe 16 being flat at its end for slidable engagement with the cam and shoe 14 being formed at its end with a socket fitting over a part of the cam. The cam forces the shoes apart to apply the brake against the resistance of a return spring 20, and the idle positions of the shoes is determined in part by an adjustable eccentric stop 22 against which shoe 16 is urged by an auxiliary spring 24.

An important feature of the invention relates to a novel adjustable device serving as a floating connection between the shoes, and preferably including a right-and-left threaded member 26 having its ends threaded into cylindrical cross pivots 28 carried by the adjacent ends of the shoes, which ends may be formed in any desired manner with relatively large sockets into which the ends of member 26 extend. At its center, member 26 is provided with a double ratchet on a collar which is illustrated as formed from two stampings 30 and 32 riveted together and keyed or otherwise fixed on member 26. The teeth of the two stampings, which may be regarded as ratchet sections, face in opposite directions as shown in Figure 2.

It will be seen that turning member 26 in one direction (i. e. operating one of the two ratchet sections 30—32) spreads the shoes apart to tighten the adjustment and take up for wear, while turning it in the other direction (i. e. operating the other of the ratchet sections 30—32) pulls the shoes toward each other to loosen the adjustment and prevent dragging of the shoes.

In order to effect either operation, I prefer to provide a plurality of pawls, preferably a lower pawl 34 engageable with ratchet section 32, and an upper pawl 36 engageable with ratchet section 30. The pawls 34 and 36 may be made as extensions of a U-shaped stamping 38, having a central opening 40 for the reduced end of an operating plunger 42. A spring 44 is confined between stamping 38 and a nut 46 on the end of plunger 42, and urges stamping 38 against the sloping face of a part or cam 48 having a squared central opening embracing a squared portion 50 of plunger 42.

Plunger 42 is supported by washers 52 and 54 slidably engaging the inner and outer faces of plate 12, the plate being formed with a large opening 56 for the plunger so that it does not interfere with the movement of the plunger as a unit, with washers 52 and 54 and with connection 26, during the application and release of the brake. Washer 52 is formed with a semi-cylindrical projection 58 embracing one side of the plunger 42 and serving as a stop engaged by a pin 60 projecting radially from the plunger 42. This permits turning the plunger approximately 180° toward "L" (loosen) or "T" (tighten) to cause the cam 48 to shift pawl 34 or pawl 36 into operative position with respect to ratchet 30—32. A spring 62 is confined between washer 54 and a head 64 on plunger 42.

It will be seen that rotation of the plunger 42 selectively shifts either pawl 34 or 36 into operative position, while lengthwise movement of the plunger operates the selected plunger to manipulate the adjustment.

While one illustrative embodiment has been described in detail, it is not my intention to limit the scope of the invention to that particular embodiment, or otherwise than by the terms of the appended claims.

I claim:

1. A brake comprising, in combination, a drum, a plate at the open side of the drum, retarding means within the drum having an adjusting device, and a plunger extending through the plate and which is movable lengthwise to operate the adjusting device.

2. A brake comprising, in combination, a drum, a plate at the open side of the drum, retarding means within the drum having an adjusting device floating with the retarding means and forming a floating expansible joint connecting two parts of the retarding means, and a plunger extending through the plate and slidably supported by the plate and which is movable lengthwise to operate the adjusting device.

3. A brake comprising, in combination, a drum, a plate at the open side of the drum, retarding means within the drum having an adjusting device, and a plunger extending through the plate and which is movable lengthwise to operate the adjusting device, together with means for setting the plunger alternatively to tighten the adjusting device or to loosen the adjusting device.

4. A brake comprising, in combination, a drum, a plate at the open side of the drum, retarding means within the drum having an adjusting device floating with the retarding means and forming a floating expansible joint connecting two parts of the retarding means, and a plunger extending through the plate and slidably supported by the plate and which is movable lengthwise to operate the adjusting device, together with means for setting the plunger alternatively to tighten the adjusting device or to loosen the adjusting device.

5. A brake comprising, in combination, a drum, a plate at the open side of the drum, retarding means within the drum having an adjusting device, means extending through the plate for operating the adjusting device, and means for setting the operating means so that the same manipulation thereof will either tighten or loosen the adjusting device as desired.

6. A brake comprising, in combination, a drum, a plate at the open side of the drum, retarding means within the drum having an adjusting device, a slidable member for operating the adjusting device, and means for setting said member so that lengthwise movement thereof will either tighten or loosen the adjusting device as desired.

7. Braking means having a wear adjustment device including an operating ratchet, in combination with selectively operable pawls engageable with the ratchet to tighten or loosen said device as desired.

8. Braking means having a wear adjustment device including an operating ratchet, in combination with one pawl which is operable to tighten said device and another pawl which is operable to loosen said device.

9. Braking means having a wear adjustment device including an operating ratchet, in combination with one pawl which is operable to tighten said device and another pawl which is operable to loosen said device, together with means for selectively operating said pawls.

10. Braking means having a wear adjustment device including an operating ratchet, in combination with one pawl which is operable to tighten said device and another pawl which is operable to loosen said device, together with a plunger for operating said pawls.

11. An adjusting device comprising, in combination, a plunger, a device carried by the plunger having two pawls, and means for shifting one or the other of said pawls into operative position.

12. An adjusting device comprising, in combination, a plunger, a device carried by the plunger having two pawls, and means for tilting said device to shift one or the other of said pawls into operative position.

13. An adjusting device comprising, in combination, a plunger, a device carried by the plunger havings two pawls, and means operated by a turning movement of the plunger for shifting one or the other of said pawls into operative position.

14. An adjusting device comprising, in combination, a plunger, a device carried by the plunger having two pawls, and means operated by a turning movement of the plunger for tilting said device to shift one or the other of said pawls into operative position.

15. An adjusting device comprising, in combination, a plunger, a device mounted on the plunger and which is formed with a plurality of pawls, and a part carried by the plunger and operated by a turning movement of the plunger to shift said pawls into different positions.

16. An adjusting device comprising, in combination, a plunger, a device mounted on the plunger and which is formed with a plurality of pawls, and a cam carried by the plunger and operated by a turning movement of the plunger to tilt said device in order to shift said pawls into different positions.

17. An adjusting device comprising, in combination, a rotatable and slidable plunger, a plurality of pawls, and means operated by rotation of the plunger to shift said pawls selectively into operative position, said pawls being operated by sliding movement of the plunger.

18. An adjusting device comprising, in combination, a rotatable and slidable plunger, a plurality of pawls, and a cam operated by rotation of the plunger to shift said pawls selectively into operative position, said pawls being operated by sliding movement of the plunger.

19. An adjusting device comprising, in combination, a threaded member having an operating ratchet, members engaging opposite sides of the ratchet to resist movement thereof, and a plunger slidable between said members to operate the ratchet.

In testimony whereof, I have hereunto signed my name.

ROBERT N. VAN BUSKIRK.